United States Patent
MacLeod

(10) Patent No.: US 7,423,780 B1
(45) Date of Patent: Sep. 9, 2008

(54) DYNAMIC SELECTION OF RENDERING INTENT FOR COLOR PROOFING TRANSFORMS

(75) Inventor: Peter S. MacLeod, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 11/696,174

(22) Filed: Apr. 3, 2007

Related U.S. Application Data

(63) Continuation of application No. 09/653,053, filed on Sep. 1, 2000, now Pat. No. 7,227,666.

(51) Int. Cl.
*G06F 15/00* (2006.01)
*G06F 3/08* (2006.01)

(52) U.S. Cl. .................. 358/1.9; 358/520; 358/523

(58) Field of Classification Search .................. 358/1.9, 358/520, 523, 518, 1.13, 501, 524, 530, 1.1, 358/504; 382/162, 166, 167
See application file for complete search history.

(56) References Cited

U.S. PATENT DOCUMENTS

| | | | |
|---|---|---|---|
| 5,243,414 A | 9/1993 | Dalrymple et al. |
| 5,539,540 A | 7/1996 | Spaulding et al. |
| 5,572,340 A | 11/1996 | Eckhardt et al. |
| 5,578,824 A | 11/1996 | Koguchi et al. |
| 5,619,347 A | 4/1997 | Taniguchi et al. |
| 5,650,942 A | 7/1997 | Granger |
| 5,754,184 A | 5/1998 | Ring et al. |
| 5,754,222 A | 5/1998 | Daly et al. |
| 5,806,081 A | 9/1998 | Swen et al. |
| 5,835,098 A | 11/1998 | Lipton |
| 5,835,627 A | 11/1998 | Higgins et al. |
| 5,872,895 A | 2/1999 | Zandee et al. |
| 5,937,089 A | 8/1999 | Kobayashi |
| 5,995,653 A | 11/1999 | Reed et al. |
| 6,008,907 A | 12/1999 | Vigneau et al. |
| 6,037,950 A | 3/2000 | Meir et al. |
| 6,043,909 A | 3/2000 | Holub |
| 6,061,501 A | 5/2000 | Decker et al. |
| 6,072,901 A | 6/2000 | Balonon-Rosen et al. |
| 6,075,888 A | 6/2000 | Schwartz |
| 6,088,038 A | 7/2000 | Edge et al. |

(Continued)

OTHER PUBLICATIONS

International Color Consortium, "File Format for Color Profiles", Specification ICC.1:Sep. 1998, http://www.color.org/ICC-1_1998-09.PDF, 1998 134 pages.

(Continued)

*Primary Examiner*—Madeleine A Nguyen
(74) *Attorney, Agent, or Firm*—Fish & Richardson P.C.

(57) ABSTRACT

In general, in one aspect, the invention features an apparatus, method, and computer program product for automatically selecting a rendering intent. A device color profile associated with a device is identified. A rendering intent is automatically selected based on the device color profile. A minimum luminance that the device can produce can be determined based on the color profile of the device. A rendering intent can be selected based on the difference between a minimum luminance that an output device can produce and a minimum luminance that an emulation device can produce.

27 Claims, 8 Drawing Sheets

U.S. PATENT DOCUMENTS

| | | | |
|---|---|---|---|
| 6,108,008 | A | 8/2000 | Ohta |
| 6,192,801 | B1 | 2/2001 | Papritz et al. |
| 6,297,826 | B1 | 10/2001 | Semba et al. |
| 6,307,961 | B1 | 10/2001 | Balonon-Rosen et al. |
| 6,342,951 | B1 | 1/2002 | Eschbach et al. |
| 6,362,808 | B1 | 3/2002 | Edge et al. |
| 6,414,690 | B1 * | 7/2002 | Balasubramanian et al. 345/589 |
| 6,421,141 | B2 | 7/2002 | Nishikawa |
| 6,459,436 | B1 | 10/2002 | Kumada et al. |
| 6,480,299 | B1 | 11/2002 | Drakopoulos et al. |
| 6,525,721 | B1 | 2/2003 | Thomas et al. |
| 6,542,634 | B1 | 4/2003 | Ohga |
| 6,549,654 | B1 | 4/2003 | Kumada |
| 6,567,543 | B1 | 5/2003 | Shiraiwa et al. |
| 6,571,009 | B1 | 5/2003 | Nielsen et al. |
| 6,603,483 | B1 | 8/2003 | Newman |
| 6,636,628 | B1 | 10/2003 | Wang et al. |
| 6,643,029 | B2 | 11/2003 | Kumada et al. |
| 6,646,762 | B1 * | 11/2003 | Balasubramanian et al. . 358/1.9 |
| 6,650,771 | B1 | 11/2003 | Walker |
| 6,671,067 | B1 | 12/2003 | Adam et al. |
| 6,680,740 | B2 | 1/2004 | Krueger |
| 6,741,262 | B1 | 5/2004 | Munson et al. |
| 6,744,534 | B1 | 6/2004 | Balasubramanian et al. |
| 6,778,300 | B1 | 8/2004 | Kohler |
| 6,781,716 | B1 | 8/2004 | Yoda |
| 6,803,921 | B1 | 10/2004 | Balasubramanian et al. |
| 6,809,833 | B1 | 10/2004 | Blair et al. |
| 6,836,345 | B1 | 12/2004 | Setchell |
| 6,873,434 | B1 | 3/2005 | Kohler et al. |
| 6,947,174 | B1 | 9/2005 | Chen et al. |
| 6,967,746 | B1 | 11/2005 | Walker et al. |
| 7,080,058 | B1 | 7/2006 | Upadhyayula et al. |
| 2001/0013953 | A1 | 8/2001 | Uekusa et al. |
| 2001/0028471 | A1 | 10/2001 | Hirokazu |
| 2005/0141008 | A1 | 6/2005 | Billow et al. |
| 2006/0001931 | A1 | 1/2006 | Dancui |

OTHER PUBLICATIONS

International Color Consortium, "Glossary of Terms", White Paper #5, http://www.color.org/ICC_white_paper5glossary.pdf, Dec. 2004, 25 pages.

* cited by examiner

DYNAMIC SELECTION OF RENDERING INTENT FOR COLOR PROOFING TRANSFORMS

CROSS-REFERENCE TO RELATED APPLICATIONS

This application is a continuation application of and claims priority to U.S. application Ser. No. 09/653,053, filed on Sep. 1, 2000, the disclosure of which is incorporated herein in its entirety.

BACKGROUND

The present invention relates generally to systems and methods for printing color data from a computer application running on a host computer.

One challenge in color publishing is to reproduce colors the eye sees on a plurality of devices, some of which may have limited color capabilities. Even the best photographic film can capture only a small portion of the colors discernible to the human eye. A computer monitor, in turn, can display only a small fraction of those colors, and a printing press can reproduce fewer colors still.

Color Management Systems

A color management system (CMS) helps to reduce or eliminate color-matching problems and makes color portable, reliable, and predictable. A CMS is a collection of software tools designed to reconcile the different color capabilities of scanners, monitors, printers, image setters, and printing presses to ensure consistent color throughout the print production process. Ideally, this means that the colors displayed on a monitor accurately represent the colors of the final output. It also means that different applications, monitors, and operating systems will display colors consistently.

The total range of colors reproduced by a device is referred to as its "gamut." A color is said to be "out of gamut" when its position in one device's color space cannot be directly translated into another device's color space. For example, the total range of colors that can be reproduced with ink on coated paper is greater than that for uncoated newsprint, so the total gamut for uncoated newsprint is said to be smaller than the gamut for coated stock. In addition, a typical cyan-magenta-yellow-black (CMYK) gamut is generally smaller than a typical red-green-blue (RGB) gamut.

A CMS is most beneficial when designing publications for output devices with small color gamuts, such as printing presses, proofers, and desktop printers. A CMS maps colors from a device with a large color gamut, like a monitor, to a device with a smaller color gamut, like a proofer or printing press, to ensure that all colors on the monitor represent colors that the output device can reproduce.

Before desktop publishing, high-end prepress operators used proprietary, or closed, systems, where all devices were integrated and calibrated to known values in order to work together. Color specialists were highly trained professionals who could work these systems to make a wide variety of adjustments to the color in a scanned image and predict, with reasonable accuracy, what the final printed piece would look like based on their manipulations.

Certain factors in the prepress, printing, film, and video industries have made these high-end proprietary solutions less viable. Desktop publishing has brought about the increase of open production systems. The design and production workflow is no longer confined to a closed system, but maybe distributed across many different systems made up of devices from different vendors.

Because each device reproduces color differently, the color you see at one stage of design and production rarely matches what you see at another. In other words, color is device-dependent—the color you see depends on the device producing it. A scanner interprets an image as certain RGB values according to its particular specifications; a particular monitor displays RGB colors according to the specifications of its phosphors; a color desktop printer outputs in RGB or CMYK according to its own specifications, and each press produces printed output according to the specifications followed (e.g., SWOP, TOYO, DIC, etc.) and the type of inks used.

Thus the need for an open color management system to communicate color reliably between different devices and operating systems. Open color management lets you compensate for the differences in these devices and communicate color in a device-independent manner.

Perhaps the most frustrating aspect of working with digital files for color output is that WYSIWYG (what you see is what you get) doesn't always apply. The color you work so hard to get "just right" on your monitor doesn't look nearly as right when you print it. The reason is simple.

By their very natures, a monitor and a printing press reproduce color in completely different ways. A monitor use the RGB color model. This is an additive color model where red, green, and blue light is combined to create colors, and combining full intensities of all three make white.

A conventional printing press, by contrast, uses the CMYK color model, in which three colors of transparent ink (cyan, magenta, and yellow) are combined—along with black (noted as K)—in varying amounts to create colors. CMYK is a subtractive color model where the inks filter the white light that reflects back from the paper and subtract some of the red, green, and blue light from the spectrum. The color we see is what's left in the spectrum. Subtracting all colors by combining the CMY inks at full saturation should, in theory, render black. (However, impurities in the existing CMY inks make full and equal saturation impossible; some RGB light does filter through rendering a muddy brown color. Hence, the addition of black ink to CMY.)

Moreover, RGB and CMYK have different color gamuts, or ranges of reproducible colors. RGB monitors can display more colors than can be matched in print. Conversely, some CMYK colors cannot be matched on-screen. Moreover, RGB gamuts vary widely between devices with some gamuts being considerably wider than others. While this may seem beneficial, wider RGB gamuts can be problematic when outputting to a press. The colors in the RGB gamut that are outside the CMYK gamut must be compressed (i.e., mapped to a space within the CMYK gamut). This always entails a loss to the quality of the original design and underscores the feeling that what you see is not what you get.

As explained above, color varies depending on the device which produces it. In other words, each device has its own color space. In a sense, each device speaks its own color language that it can't communicate well to another device. What's needed is an interpreter. A color management system interprets these color languages using a device-independent color model as its neutral color language by which all color information is referenced. The particular color model used is the International Committee on Illumination (CIE) 1931 2-degree standard observer, from which the CIEXYZ (1931) and CIELAB (1976) color spaces can be derived. CIE's standard for measuring color is based on how the human eye perceives it.

The color-managed workflow is fairly straightforward and possesses two major characteristics. First, images are edited in a device-independent color space which is larger than the color space of the output device, such as a computer monitor, a TV screen, film, or a four-color press. Second, image files can be saved with profiles that contain information describing the characteristics of the source and output color devices.

These two considerations make a color-managed workflow advantageous. The image files become portable since they can be repurposed for output on widely differing devices simply by tagging them with different output profiles.

The ICC Color Management Model

In 1993, members of the computer and color publishing industry began working toward a common approach to color management. They formed the International Color Consortium (ICC) in order to establish color standards that would help users achieve reliable and reproducible color throughout the entire reproduction process. They also endorsed an open framework for developing color management systems.

An ICC color management system has three major components:

A device-independent color space, also known as a Reference Color Space.

Device profiles that define the color characteristics of a particular device.

A Color Management Module (CMM) that interprets the device profiles and carries out the instructions on what to do with different device's color gamuts.

One of the first decisions made by the ICC was to assign the responsibility for color space transformations to the operating system. Placing the responsibility there meant that color management would not have to be replicated in each application while still being available to all applications. Device color profiles (sometimes referred to simply as "profiles"), which contain information on the color behavior of the various peripherals, provide the data necessary to perform these transformations.

The ICC chose the CIE color model as the device-independent color space for color management. Since device-specific colors from any device can be mapped into a device-independent color space, it's much easier to combine equipment from different vendors into one system and maintain color specifications. Because they are well-defined and reproducible, the CIE color spaces (CIELAB and CIEXYZ) are an excellent language for communicating color information between different systems.

Device Profiles

A color management system must have available to it the characteristics of each device in the production process, namely their color "behaviors" and color gamuts. It gets this information from files called device profiles. A device profile enables the CMS to convert between a device's native color space and a device-independent reference color space (i.e., CIELAB or CIEXYZ).

Each device in the production system has its own device profile, either provided as part of the CMS, available from the device's manufacturer, or included with third party hardware, software, or both. The CMS uses these profiles to convert one device dependent color space into the device independent reference color space and then to a second device dependent color space (that of the output device).

Device profiles characterize a particular device by describing the characteristics of the color space for that device in a particular state. Some devices have only one profile, for example a monitor. Others, like printers, may have several since any changes to the printer state need to be accounted for in a separate profile.

Profiles can also be embedded within image files. Embedded profiles allow for the automatic interpretation of color information as the color image is transferred from one device to another.

Device profiles are divided into three classifications:
1. Input profiles for devices such as scanners and digital cameras (also known as source profiles).
2. Display profiles for devices such as monitors and flat panel screens.
3. Output profiles for devices such as printers, copiers, film recorders, and printing presses (also known as destination profiles).

Color Management System Workflow

FIG. 1 illustrates the concepts for matching colors from one device to another for a computer system 100. System 100 includes a monitor 102, a scanner 104, and a printer 106. When a document is scanned into scanner 104, it becomes a data set in the device-dependent color space of scanner 104. In order to view the colors of the document on monitor 102, the data set must be transformed into the color space of the monitor.

This is a two-step process. First the data set is transformed into a device-independent color space referred to as a "profile connection space" (PCS) 110, using an input profile 108 that describes the color behavior of scanner 104. Then the data in profile connection space 110 is transformed into the color space of monitor 102 using display profile 112, which describes the color behavior of monitor 102. In order to print the data, it is transformed from profile connection space 110 to the color space of printer 106 using output profile 114, which describes the color behavior of printer 106.

The Color Management Module (CMM)

The Color Management Module (CMM) is the part of the CMS that maps one gamut to another. When colors consistent with one device's gamut are displayed on a device with a different gamut, a CMM uses device profiles and rendering intents to optimize the displayed colors between the two devices. The CMM does this by mapping the out-of-gamut colors into the range of colors that can be produced by the destination device.

Each CMS has a default CMM, but may support additional CMMs as well. For example, Apple ColorSync 2.0, a CMS for the Mac OS, uses Linotype-Hell's CMM by default, but also supports other CMMs such as those in Kodak's KCMS and Agfa's FotoTune.

Rendering Intent

A CMM maps colors from one device's color space to another according to a rendering intent. The rendering intent determines the method the CMM uses for converting (i.e., mapping) colors from one device's gamut to another. The four rendering intents are perceptual, saturation, relative calorimetric, and absolute calorimetric.

Perceptual. Compresses the total gamut from one device's color space into the gamut of another device's color space. This preserves the visual relationship between colors by shrinking the entire color space and shifting all colors - including those that were in gamut.

Saturation. Reproduces the original image color saturation (vividness) when converting into the target device's color space. In this approach, the relative saturation of colors is maintained from gamut to gamut. This render intent is primarily designed for business graphics, where the exact relationship between colors (such as in a photographic image) is not as important as are bright saturated colors.

Relative Colorimetric. When a color in the current color space is out of gamut in the target color space, it is mapped to the closest possible color within the gamut of the target color space, while colors that are in gamut are not affected. Only the colors that fall outside of the destination gamut are changed. This render intent can cause two colors which appear different in the source color space to be the same in the target color space. This is called "clipping". This is the default method of color conversion built into Adobe Inc.'s Photoshop 4.0 and earlier. The "relative" in Relative Colorimetric means that the colors are scaled relative to the paper white, i.e. that a pure white color (i.e. $L^*=100$, $a^*=b^*=0$) is rendered as paper white on the output device.

Absolute Colorimetric. Colors match exactly with no adjustment made for white point or black point that would alter the image's brightness. Absolute colorimetric is valuable for rendering "signature colors", those colors that are highly identified with a commercial product such as the yellow used by the Eastman Kodak Company, or the red used by the Coca-Cola Company. In Absolute Colorimetric rendering, the color of white (i.e. the color of the paper for a printer space) is preserved as much as possible on the output device. For example, a newsprint profile would have a fairly dark, slightly yellow paper color. In Absolute Colorimetric rendering, this color would be rendered in regions of the page that were white, but in Relative Colorimetric rendering, the white regions would not be marked at all.

In a conventional color publishing system, the final step in the color publishing process is the printing run, where a printing press creates a large number of color copies of a document for distribution. The printing run is an expensive process, so it is essential that designers know what the colors on the document produced by the printing press will look like before sending it to the printing press. Designers use an emulation process referred to as "color proofing" to simulate the output of the printing press. In color proofing, a printer, referred to as a "proofing printer" is used to emulate the printing press.

Proofing printers are usually CMYK devices which try to emulate what would happen if one used the same CMYK data on another output device such as a conventional offset lithographic press. If a proofing printer had the same gamut as a printing press, the selection of the appropriate rendering intent to use would be straightforward. Unfortunately, in the world of inkjet printers, the gamuts of devices vary widely depending on what stock is used in the printer, what mode is used to print, and other similar factors.

One approach that has been taken is to let the user decide which rendering intent to use. However, most users don't understand proper selection of rendering intents and either make an inappropriate selection or never bother to select a rendering intent at all. Another approach is for the rendering intent to be fixed in advance for use in all circumstances, thereby producing good results in some circumstances and mediocre results on others.

SUMMARY

In general, in one aspect, the invention features an apparatus, method, and computer program product for automatically selecting a rendering intent. It includes identifying a device color profile associated with a device; and automatically selecting a rendering intent based on the transform defined by the device color profile.

Particular implementations can include one or more of the following features. The device is a device to be emulated. The device is a printing press. A selection is received that is indicative of the device color profile. It includes determining a minimum luminance the printing press can produce; and selecting one of a plurality of rendering intents based on a comparison of the minimum luminance to one or more predefined thresholds. Selecting includes selecting a first rendering intent when the minimum luminance exceeds a predefined threshold; and selecting a second rendering intent otherwise. Selecting a first rendering intent includes selecting a perceptual rendering intent; and selecting a second rendering intent includes selecting a calorimetric rendering intent.

It includes receiving input data from a graphic arts application; generating output data using the input data and the selected rendering intent; and sending the output data to a proofing printer. Selecting a first rendering intent includes selecting a composite rendering intent. Selecting a second rendering intent includes selecting a composite rendering intent. It includes identifying an emulation device color profile associated with an emulation device; wherein the selecting step further comprises selecting a rendering intent based on the emulation device color profile.

The device is a device to be emulated and the emulation device is a device to generate the output of the emulation. The device is a printing press and the emulation device is a proofing printer, and a selection is received that is indicative of the printing press color profile; and a selection is received that is indicative of the proofing printer color profile.

In general, in another aspect, the invention includes selecting a first rendering intent when the difference between a minimum luminance the printing press can produce and a minimum luminance the proofing printer can produce exceeds a predefined value; and selecting a second rendering intent otherwise.

Particular implementations can include one or more of the following features. It includes selecting a first rendering intent includes selecting a perceptual rendering intent; and selecting a second rendering intent includes selecting a calorimetric rendering intent. Selecting a first rendering intent includes selecting a composite rendering intent. Selecting a second rendering intent includes selecting a composite rendering intent.

In general, in another aspect, the invention includes selecting a first rendering intent when a color gamut of the printing press is substantially contained within a color gamut of the proofing printer; and selecting a second rendering intent otherwise.

Particular implementations can include one or more of the following features. Selecting a first rendering intent includes selecting a perceptual rendering intent; and selecting a second rendering intent includes selecting a colorimetric rendering intent. Selecting a first rendering intent includes selecting a composite rendering intent. Selecting a second rendering intent includes selecting a composite rendering intent.

Advantages that can be seen in implementations of the invention include one or more of the following. An appropriate rendering intent is selected without user intervention. The appropriate rendering intent is selected based on system design.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

DETAILED DESCRIPTION

A Color Proofing System

Figure 1:
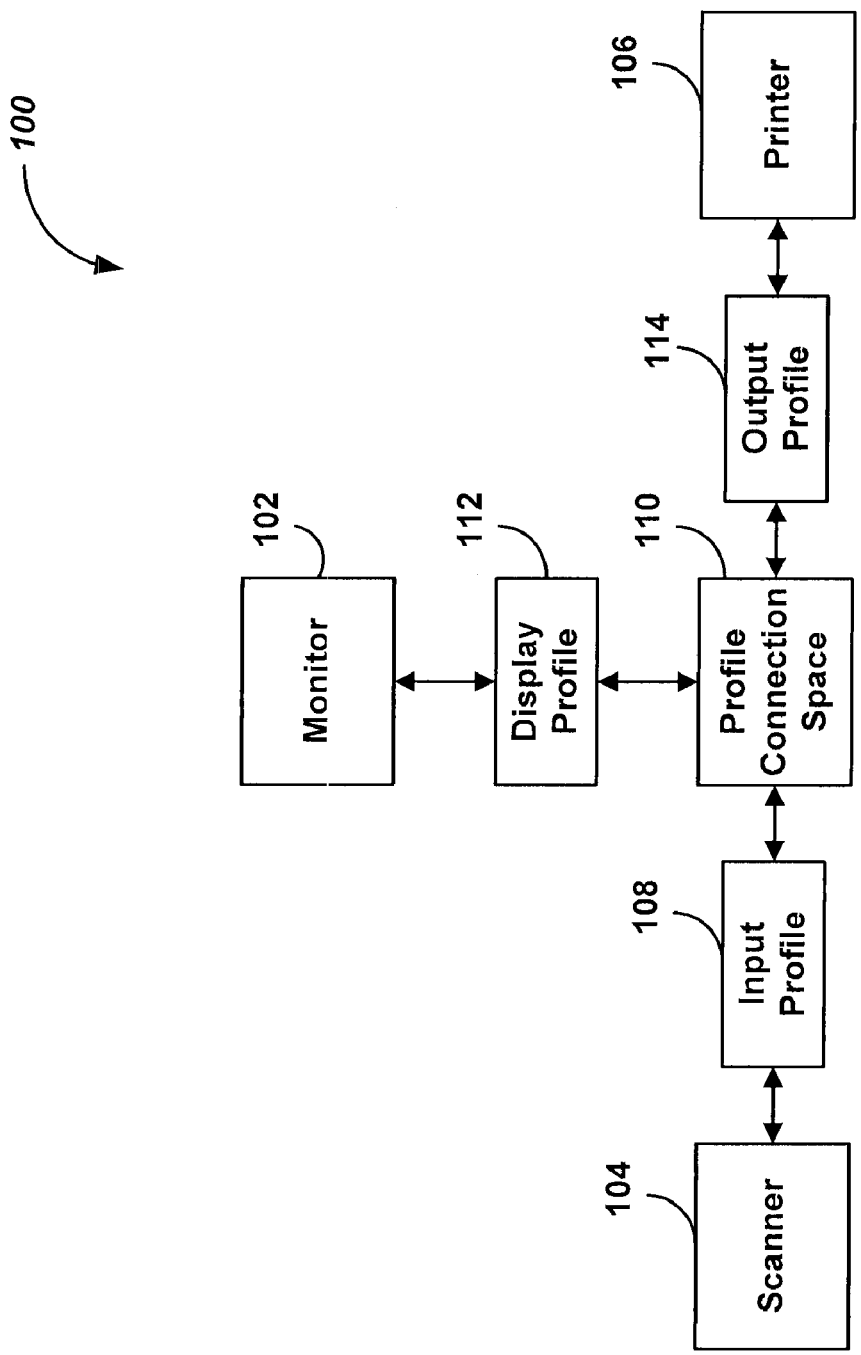
FIG. 1 illustrates matching colors from one device to another for a computer system.
Figure 2:
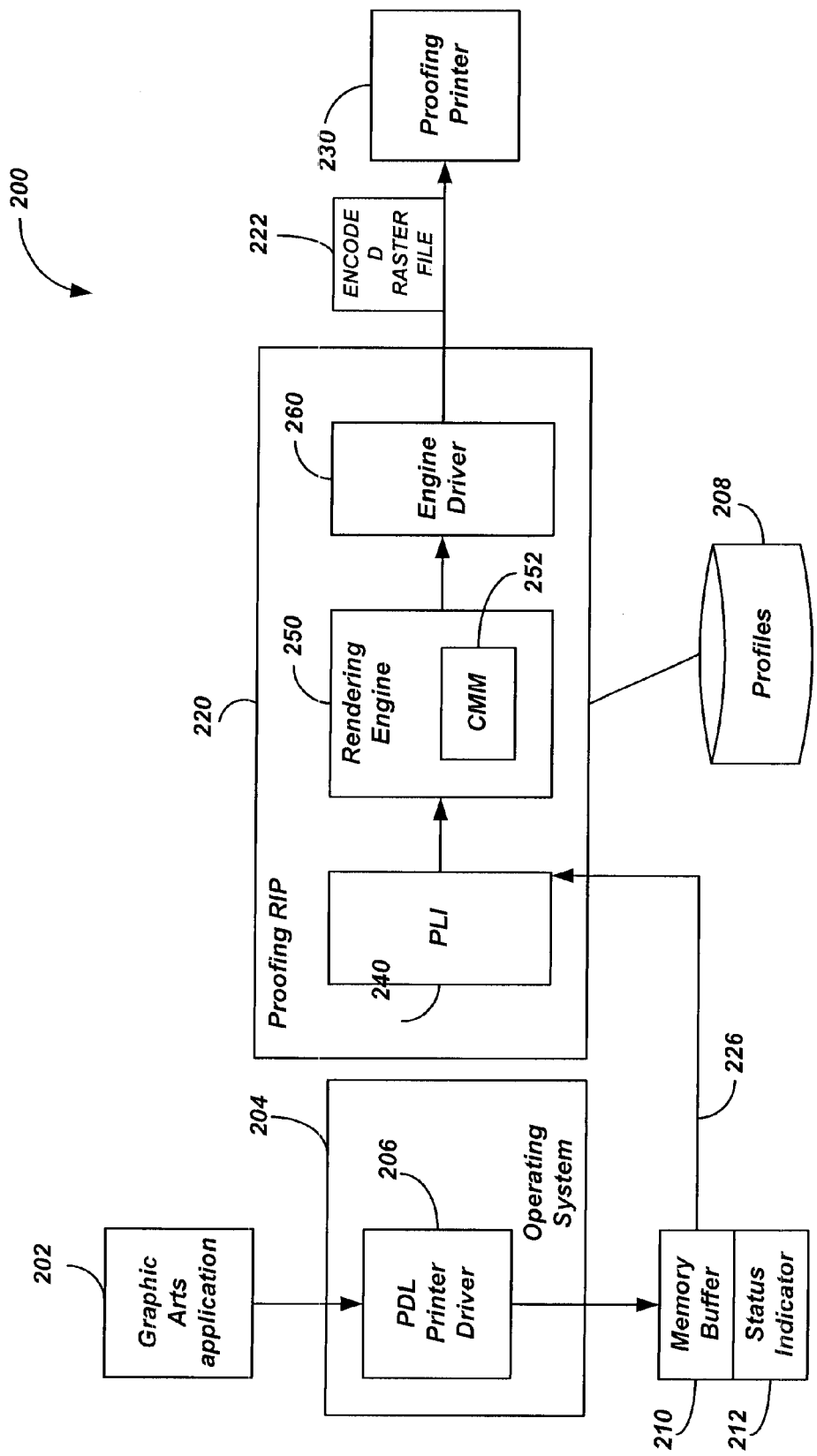
FIG. 2 shows a system for color proofing.

Turning now to FIG. 2, a system 200 for color proofing is shown. In the system 200, a graphic arts application 202 generates a print request in response to a user selection. The user selection specifies a destination device and an emulation device. In one color proofing application, the destination device is a printing press to be emulated and the emulation device is a proofing printer 230 to generate the output of the emulation.

The print request is sent to an operating system 204, such as the Windows OS, using an operating system call. The operating system 204 in turn directs the print request to a page definition language (PDL) printer driver 206. The printer driver 206 translates the operating system calls and generates a print stream that is stored in memory buffer 210.

In one implementation, the printer driver 206 fills the memory buffer 210 with a portion of the print stream. The printer driver 206 then updates a status indicator 212 by sending a message (in one implementation through the operating system) to a raster image processor (RIP) 220 to let RIP 220 know that data is present in the memory buffer 210. The RIP 220 consumes the contents of the memory buffer 210 upon receipt of the message and generates raster data which is suitably encoded for the proofing printer in an encoded raster file 222. The process repeats for each portion of the print stream. Alternatively, memory buffer 210 can be sized to store the entire print stream and RIP 220 may consume all or a predetermined amount of the contents of memory buffer 210 when the message is received.

In a second implementation running on an Apple Macintosh OS, the status indicator 212 is a flag in memory that is modified by the printer driver 206. The RIP 220 periodically monitors the status indicator 212, and clears it after processing the buffer contents.

Generally, the print stream contains a compact description of how each of the pages of the printed page will appear, including the text to appear on the page, the fonts to be used, the graphics or line art to be included, and the colors to be used. The RIP 220 interprets the print stream into one or more display lists. Each display list specifies objects and their corresponding positions on the page as well as color/density information and other characteristics. For example, the display list may specify the text information to be imaged and the position of the text on the page among others.

The RIP 220 then renders the display list instructions constructing a bitmap image of the page to be rendered in memory. For example, the RIP 220 can render the display list instructions forming a bitmap which is stored in a raster data buffer. For color imaging, the RIP may add color information to the raster information. For a color device, each pixel of the raster encodes color information, i.e. instead of a single bit indicating "mark" there is a color value, say R, G, B or C, M, Y, K. Different encodings are possible (interleaved vs. banded). Finally, the RIP encodes the bitmap into a format acceptable to a printer and sends the encoded data (encoded raster file 222) to the printer using an operating system service.

A print stream 226 from memory buffer 210 (FIG. 2) is received by RIP 220 and directed to a print language interpreter 240. Print language interpreter 240 interprets the page description language and sends the interpreted data to a rendering engine 250. The rendering engine 250 in turn generates a raster output, which is provided to an engine driver 260. The engine driver 260 packages the raster output in a format specified for the designated output device. The output of the engine driver 260 is an encoded raster block 222 which can be sent to the spooler for subsequent transmission to proofing printer 230.

On a Windows-based computer, a spooler program may accept the encoded raster file 222 from the RIP 220 and store the encoded raster file 222 in a memory buffer until it is sent to the selected output device. Alternatively, on a Macintosh computer, an operating system service is available for sending the encoded raster file 222 to the selected output device.

In proofing printer 230, a decoder converts the encoded bitmap image back to raster data. The decoder may also perform other operations such as separating color planes and separating control information from bitmap data. The actual conversion depends on the particularities of the printer's printing mechanism or printhead.

In one implementation, the printer driver 206 is a PostScript™ driver. The PostScript™ driver takes in Graphical Drawing Interface (GDI), QuickDraw or PostScript™ (depending on platform and application) and outputs PostScript™. A PostScript™ print language interpreter 240 of the RIP 220, takes in the PostScript™ stream and outputs marking information and data to a rendering engine 250. The rendering engine 250 renders the marking information and data producing bitmap data in rendered bands that can be transferred to an engine driver 260. The engine driver converts the data into an encoded form (encoded raster file 222) that can be interpreted by proofing printer 230.

Figure 3:
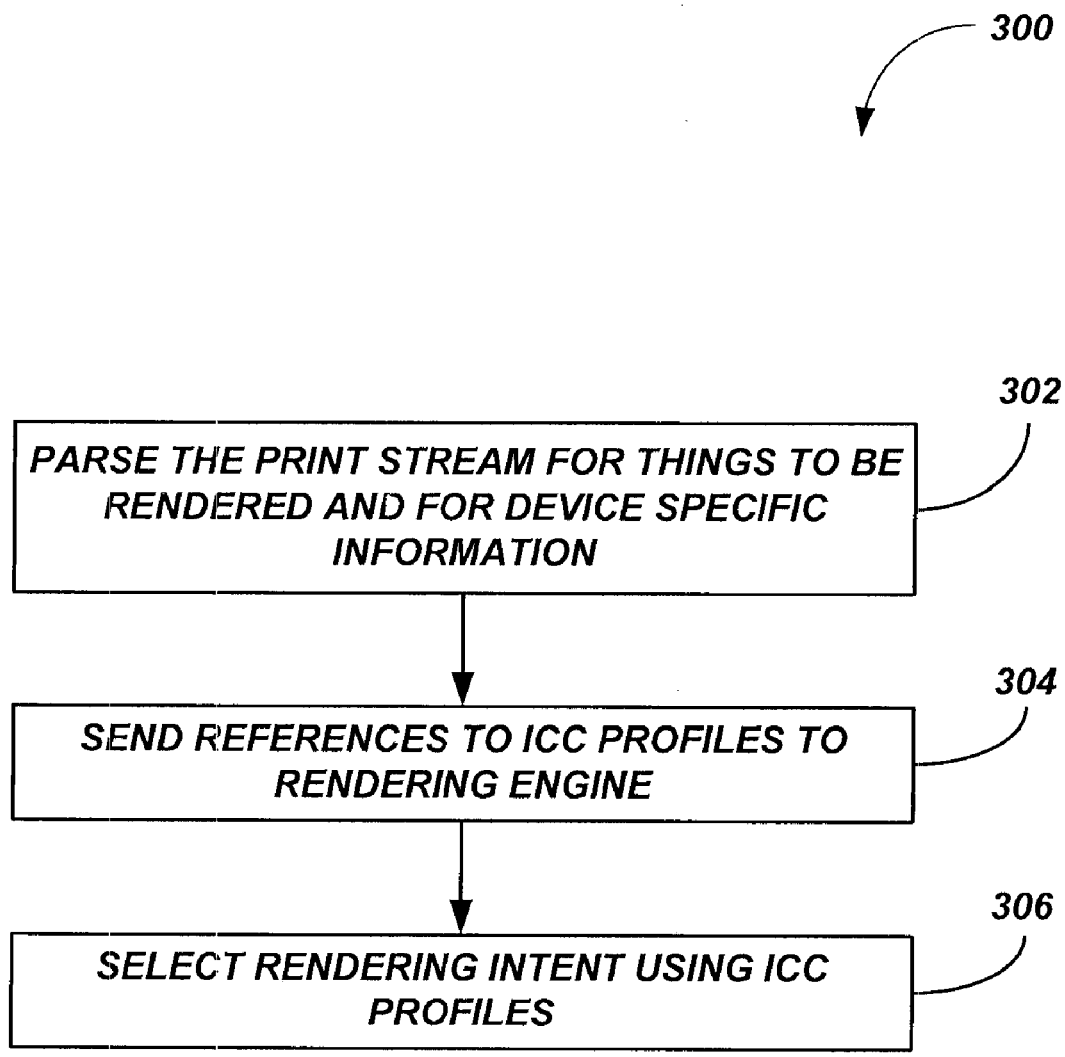
FIG. 3 shows a process executed by a print language interpreter and a rendering engine in selecting a rendering intent.

FIG. 3 shows a process 300 executed by the print language interpreter 240 (FIG. 2) and rendering engine 250 (FIG. 2). The process first parses the print stream, both for things to be rendered and for device specific information (step 302). According to one implementation, the device specific information includes a reference to the ICC profile for the proofing printer 230 (FIG. 2). In another implementation, the device-specific information also includes a reference to the ICC profile for the printing press to be emulated.

In one implementation, the references to ICC profiles are then sent to the rendering engine 250 (step 304) to customize RIP 220 (step 304). These profiles provide the information for a color management framework default color management module (CMM) 252 (FIG. 2) to transform color information between native device color spaces. Rendering engine 250 uses one or both of the ICC profiles to select a rendering intent to be used for color transformations (step 306).

Automatic Selection of Rendering Intents

Figure 4:
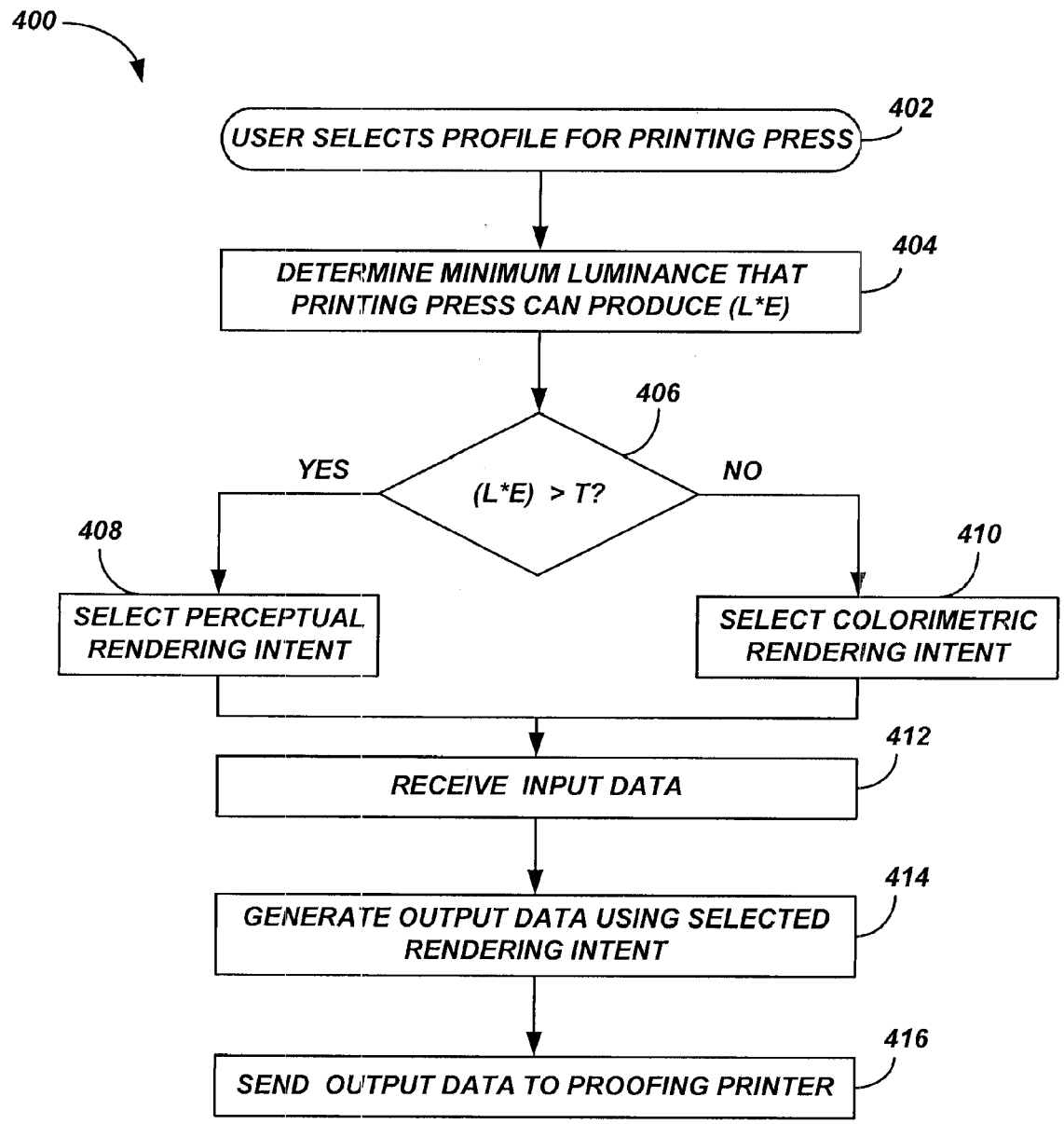
FIG. 4 shows a process executed by the rendering engine in selecting a rendering intent.

FIG. 4 shows a process 400 executed by rendering engine 250 (FIG. 2) in selecting a rendering intent according to one implementation of the present invention. Process 400 corresponds to step 306 of process 300 (FIG. 3). According to this process, the minimum luminance that the printing press can produce, represented as a CIELAB luminance value (L*E), is compared to a predetermined threshold value. One of two rendering intents is selected based on this comparison. It is contemplated that this method will be extended to include multiple thresholds and corresponding rendering intents.

As described above, the user has selected a profile for a printing press to be emulated (step 402). The process employs the printing press profile to determine the minimum luminance that the printing press can produce (L*E) (step 404).

In one implementation, the minimum luminance that a printer can produce is determined according to the following process for most printers. A patch having maximum CMYK values (that is, 100% for all colorants) is applied to the Device-to-PCS table of the printer profile using relative calorimetric intent. The resulting luminance value is taken as the minimum luminance that the printing press can produce.

When the printer is an inkjet printer, the process is slightly modified because some inkjet printers print lighter as more colored ink is added to black in some modes. According to this modification, a patch having minimum luminance values (i.e. L*=0) is applied to the PCS-to-Device table of the printer profile using relative calorimetric intent to get a CMYK equivalent for the darkest CMYK color that the printer can print. Then the CMYK equivalent is applied to the Device-to-PCS table of the printer profile using relative colorimetric intent. The resulting luminance value is taken as the minimum luminance that the printing press can produce.

The minimum luminance that the printing press can produce (L*E) is compared to a predetermined threshold (step 406). For example, the predetermined threshold can be L*=8.0. If L*E exceeds the threshold, then perceptual rendering intent is selected (step 408). Otherwise, a colorimetric rendering intent is selected (step 410). In one implementation, a composite rendering intent is selected in step 410. The composite rendering intent is discussed in greater detail below. In another implementation, a composite rendering intent is selected in step 408.

Once a rendering intent has been selected and the associated input data has been received (step 412), the process generates output data by transforming the input data using the proofing printer profile as the target, the printing press profile as the source, and the selected rendering intent according to well-known color transformation methods (step 414). The output data is then sent to the proofing printer (step 416).

Figure 5:
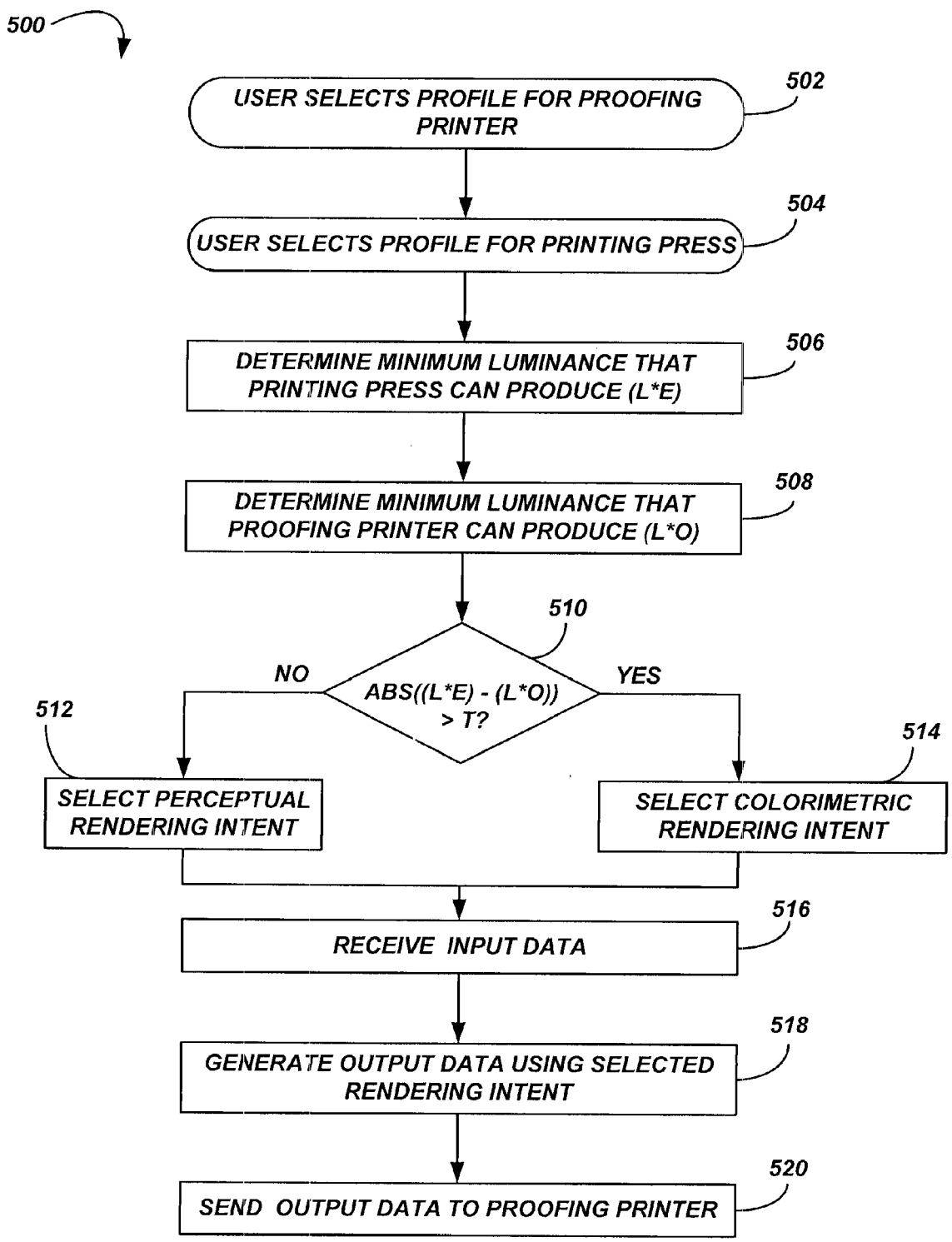
FIG. 5 shows another process executed by the rendering engine in selecting a rendering intent.

FIG. 5 shows a process 500 executed by rendering engine 250 (FIG. 2) in selecting a rendering intent according to another implementation of the present invention. Process 500 corresponds to step 306 of process 300 (FIG. 3). According to this process, the difference between the minimum luminance that the printing press can produce, represented as a CIELAB luminance value (L*E) and the minimum luminance that the printing press can produce, represented as a CIELAB luminance value (L*O), is compared to a predetermined threshold value. One of two rendering intents is selected based on this comparison. It is contemplated that this method will be extended to include multiple thresholds and corresponding rendering intents.

As described above, the user has selected profiles for a proofing printer (step 502) and a printing press to be emulated (step 504). The process employs the printing press profile to determine the minimum luminance that the printing press can produce (L*E) (step 506) according to the method described above. The process employs the proofing printer profile to determine the minimum luminance that the proofing printer can produce (L*O) (step 508) according to the same method.

The difference between the minimum luminance that the printing press can produce (L*E) and the minimum luminance that the proofing printer can produce (L*O) is compared to a predetermined threshold (step 510). For example, the predetermined threshold can be 5.0L*. If the difference exceeds the threshold, then a perceptual rendering intent is selected (step 512). Otherwise, a calorimetric rendering intent is selected (step 514). In one implementation, the colorimetric rendering intent is a relative calorimetric rendering intent. In another implementation, a composite rendering intent is selected in step 514. In another implementation, a composite rendering intent is selected in step 512.

Once a rendering intent has been selected and the associated input data has been received (step 516), the process generates output data by transforming the input data using the proofing printer profile as the target, the printing press profile as the source, and the selected rendering intent according to well-known color transformation methods (step 518). The output data is then sent to the proofing printer (step 520).

Figure 6:
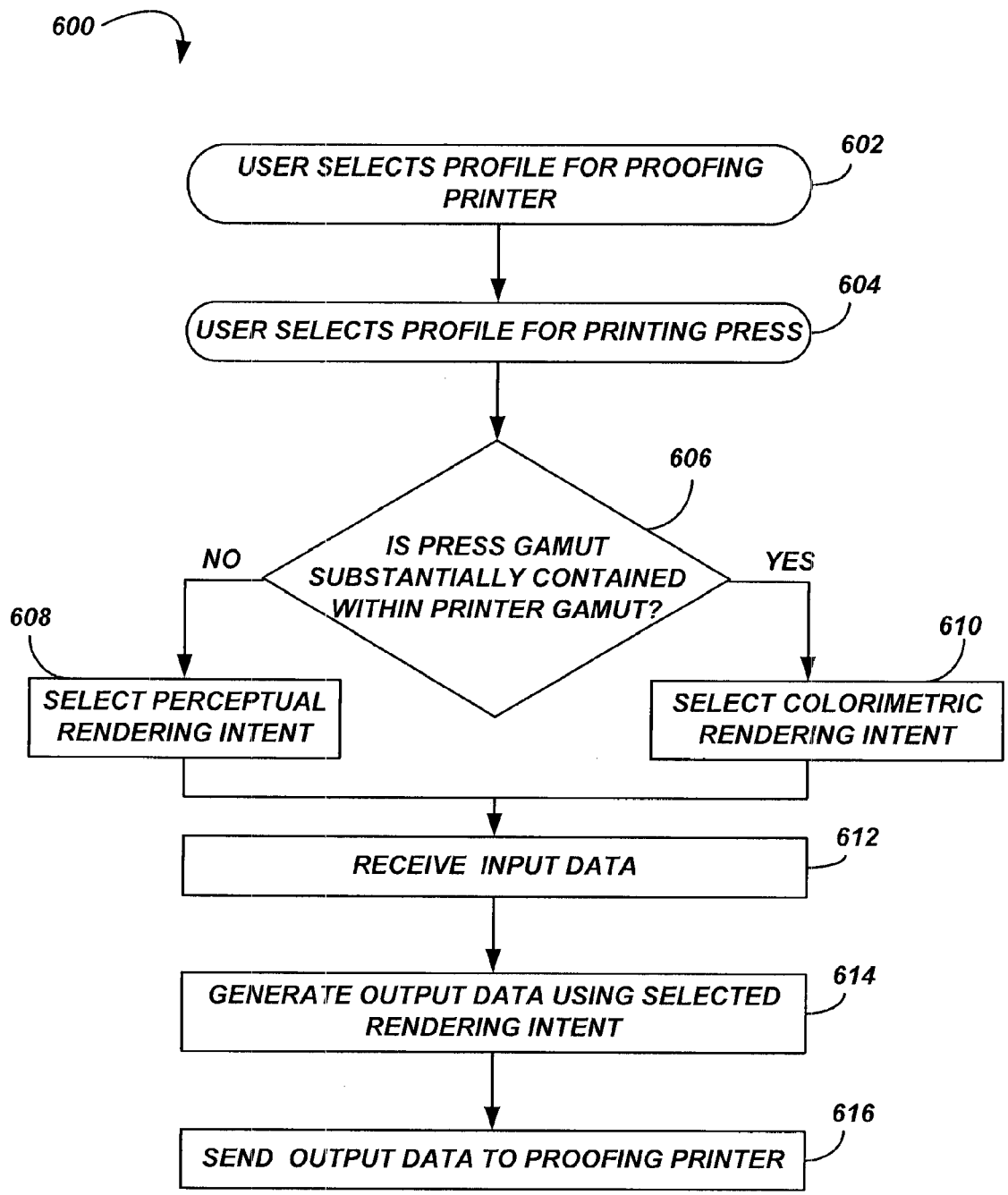
FIG. 6 shows a third process executed by the rendering engine in selecting a rendering intent.

FIG. 6 shows a process 600 executed by rendering engine 250 (FIG. 2) in selecting a rendering intent according to another implementation of the present invention. Process 600 corresponds to step 306 of process 300 (FIG. 3). According to this process, the gamut of the printing press profile is compared to the gamut of the printer profile. One of two rendering intents is selected based on this comparison. It is contemplated that this method will be extended to include multiple thresholds and corresponding rendering intents.

As described above, the user has selected profiles for a proofing printer (step 602) and a printing press to be emulated (step 604). The process examines the profiles to compare the gamuts of the proofing printer and printing press (step 606). In one implementation, step 606 includes the following method.

The method begins with an examination of the 'gamut' tags in the ICC profiles for the proofing printer and printing press. These tags contain a 3-dimensional grid of table entries, with a flag at each entry telling whether that entry is in gamut for the device. For each cell in the gamut table which is in-gamut in the source device, the method finds the appropriate cell in the target gamut (which might be a different location in the grid if the grid spacings are different in the two profiles). The method computes the ratio of the number of in-gamut cells in the printing press profile to the number of corresponding cells which are in-gamut in the proofing printer profile. This ratio represents an estimate of the ability of the proofing printer to cover the gamut of the printing press.

If the gamut of the printing press is substantially contained within the gamut of the printer, then a calorimetric rendering intent is selected (step 610). Otherwise, a perceptual rendering intent is selected (step 608). In one implementation, the colorimetric rendering intent is a relative colorimetric rendering intent. In another implementation, a composite rendering intent is selected in step 610. In another implementation, a composite rendering intent is selected in step 608.

Once a rendering intent has been selected and the associated input data has been received (step 612), the process generates output data by transforming the input data using the proofing printer profile as the target, the printing press profile as the source, and the selected rendering intent according to well-known color transformation methods (step 614). The output data is then sent to the proofing printer (step 616).

Composite Rendering Intent

According to one aspect of the present invention, a composite rendering intent is provided. In one implementation, the composite rendering intent uses a calorimetric rendering intent to transform data from an input color space to the profile connection space and a perceptual rendering intent to transfonn data from the profile connection space to the output color space. It is contemplated that other rendering intents may be used within the composite rendering intent.

According to one implementation, a single rendering intent is used for both color transformations in the composite rendering intent. One application of a composite rendering intent using the same two rendering intents is to convert a color that is nearly gray to gray by converting to the CIELAB color space, zeroing the color components (A, B), and converting the result to the destination color space.

Figure 7:
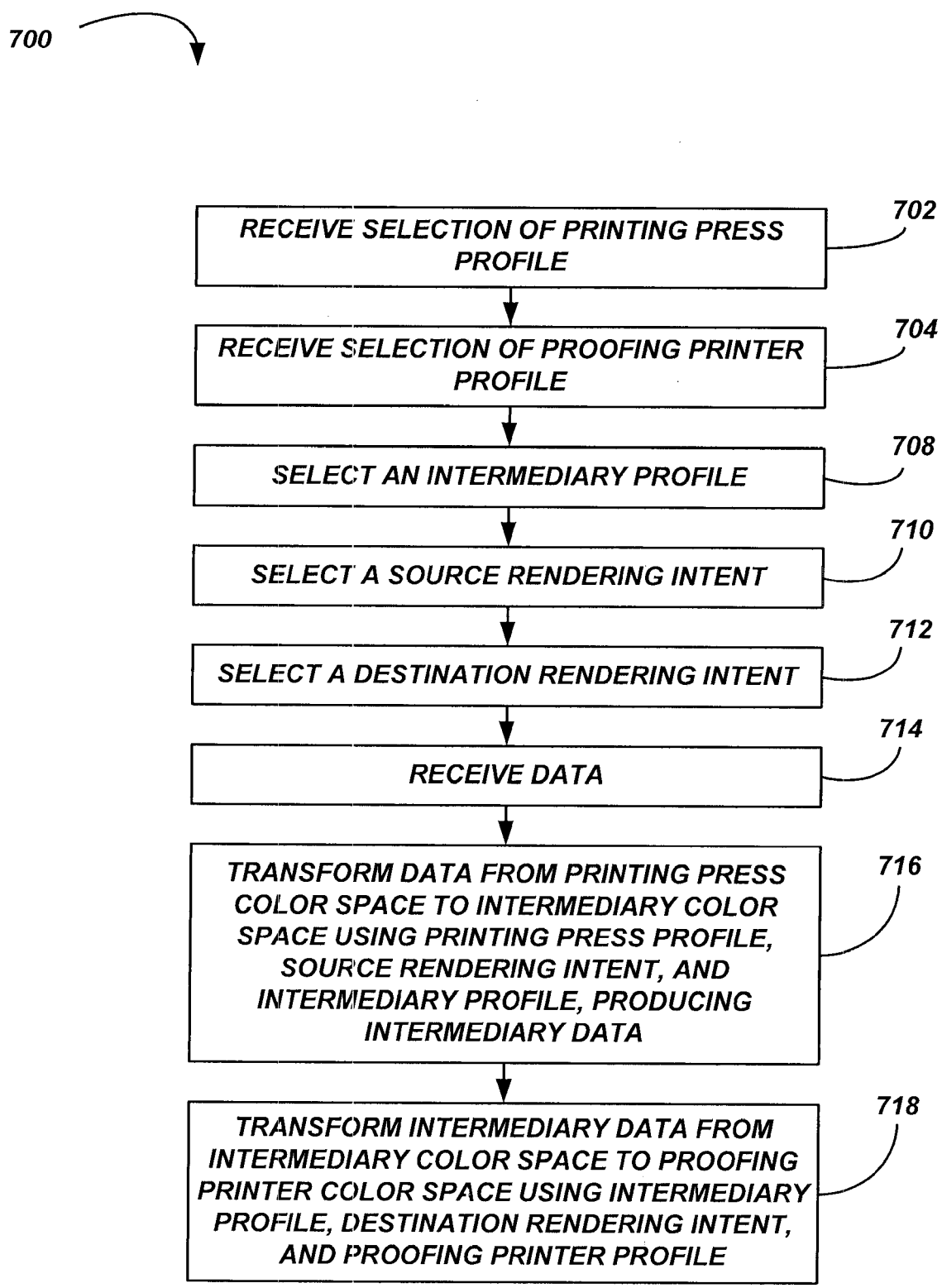
FIG. 7 shows a process for transforming data from a source device color space to a destination device color space using a composite rendering intent.

FIG. 7 shows a process 700 for transforming data from a source device color space to a destination device color space using a composite rendering intent. In the color proofing application described above, the source device is a printing press and the destination device is a proofing printer. In one implementation, process 700 is executed by rendering engine 250 (FIG. 2).

The process receives a selection of a printing press profile (step 702) and a proofing printer profile (step 704). In one implementation, these selections are made by a user of the application.

The process selects an intermediary profile for the transform. This profile is associated with a profile connection space, such as CIELAB or CIEXYZ. The process also selects source and destination rendering intents (steps 710 and 712). The selections of steps 708, 710 and 712 may be made automatically by the process, by the user of the graphic arts application, or may be coded into the process before execution. In one implementation, the source rendering intent is colorimetric, the intermediary profile is the CIELAB profile, and the destination rendering intent is perceptual. The process also receives the data to be transformed (step 714). In the color proofing application described above, the data is a print request generated by a graphic arts application.

The data is transformed from the color space of the printing press to the intermediary color space (step 716). The transformation uses the printing press device profile, a source rendering intent, and the intermediary profile, thereby producing intermediary data.

Next the intermediary data is transformed from the intermediary color space to the proofing printer color space (step 718). The transformation uses the intermediary profile, the destination rendering intent, and the proofing printer profile. The transformation of the data using the composite rendering intent is then complete.

Exemplary Computer System

Figure 8:
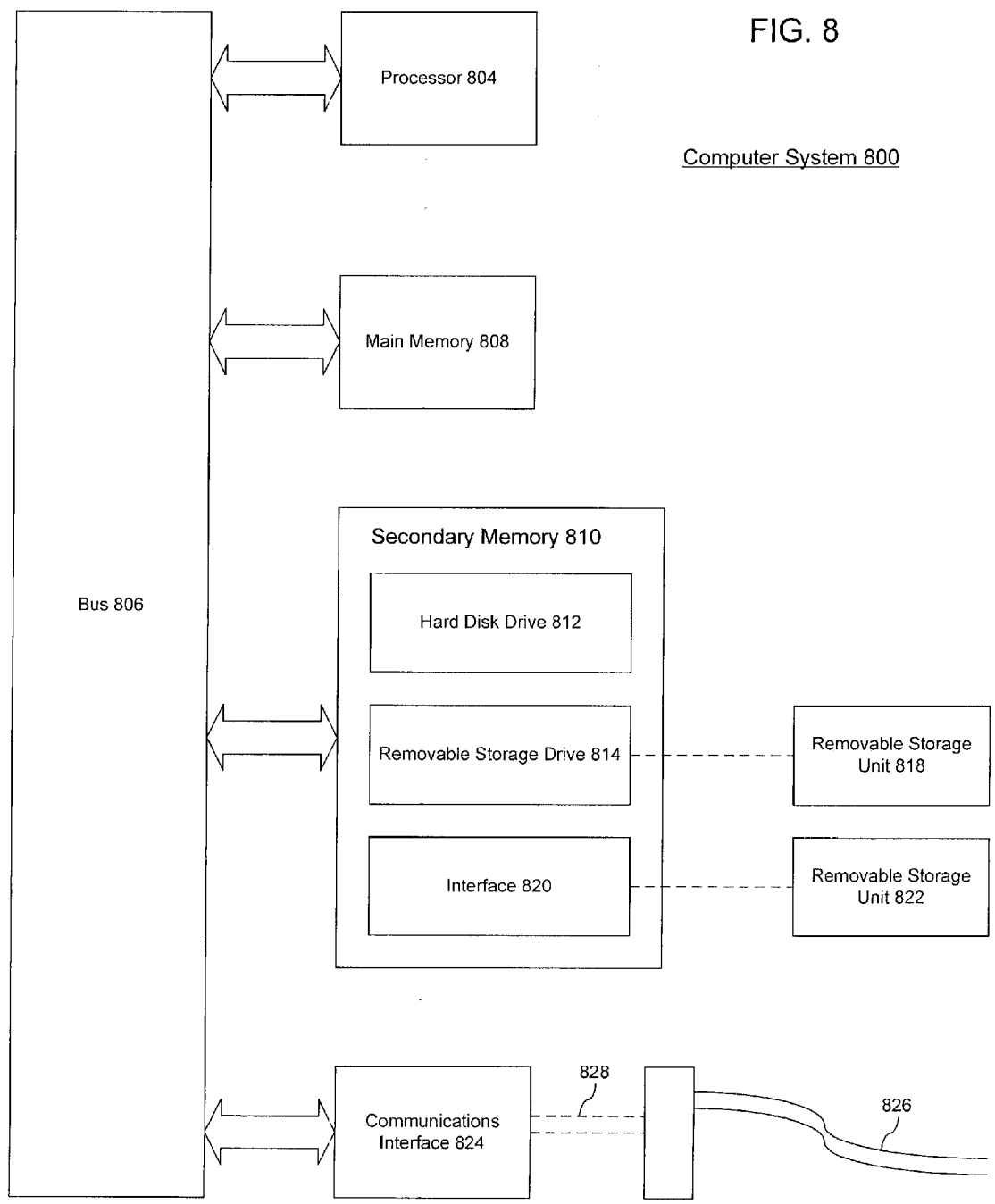
FIG. 8 depicts an exemplary computer system that can be programmed to carry out the method of the present invention.

The present invention may be implemented using hardware, software or a combination thereof and may be implemented in a computer system or other processing system. In fact, in one implementation, the invention is directed toward one or more computer systems capable of carrying out the functionality described herein. An exemplary computer system 800 is shown in FIG. 8. The computer system 800 includes one or more processors, such as processor 804. The processor 804 is connected to a communication bus 806. Various software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means can include, for example, a removable storage unit 822 and an interface 820. Examples of such include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 818 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface 824 via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 818, a hard disk installed in hard disk drive 812, and signals 826. These computer program products are means for providing software to computer system 800.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an implementation where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another implementation, the invention is implemented primarily in hardware using, for example, hardware components such as application specific integrated circuits (ASICs). Implementation of the hardware state machine so as to perform the functions described herein will be apparent to persons skilled in the relevant art(s). In yet another implementation, the invention is implemented using a combination of both hardware and software.

While various implementations of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example implementations, but should be defined only in accordance with the following claims and their equivalents.

What is claimed is:

1. A computer-implemented method, comprising:
   identifying a first device color profile associated with an output device;
   identifying an emulation device color profile associated with an emulation device, the emulation device color profile being different from the first device color profile;
   determining a first minimum luminance that the output device can produce based on the first device color profile;
   determining a second minimum luminance that the emulation device can produce based on the emulation device color profile; and
   selecting a rendering intent based on a difference between the first minimum luminance and the second minimum luminance.

2. The method of claim 1, further comprising:
   selecting a perceptual rendering intent when the difference between the first minimum luminance and the second minimum luminance exceeds a predefined value; and
   selecting a calorimetric rendering intent otherwise.

3. The method of claim 1, further comprising:
   selecting a composite rendering intent when the difference between the first minimum luminance and the second minimum luminance exceeds a predefined value.

4. The method of claim 1, further comprising:
   selecting a composite rendering intent when the difference between the first minimum luminance and the second minimum luminance does not exceed a predefined value.

5. The method of claim 1, further comprising:
   deriving the first minimum luminance based on the device color profile with respect to maximum colorant values.

6. The method of claim 5, wherein the output device is an inkjet printer, and determining the maximum colorant values includes:
   determining darkest colorant values that the inkjet printer can print.

7. The method of claim 5, wherein the emulation device is an inkjet printer, and determining the maximum colorant values includes:
   determining darkest colorant values the inkjet printer can print.

8. The method of claim 1, wherein the emulation device is a device configured to generate output simulating the output device.

9. The method of claim 8, wherein the output device is a printing press and the emulation device is a proofing printer, the method further comprising:
   receiving a selection indicative of the printing press color profile; and
   receiving a selection indicative of the proofing printer color profile.

10. A computer program product, tangibly embodied in a computer-readable medium, the product comprising instructions operable to cause a processor to:
    identify a first device color profile associated with an output device;
    identify an emulation device color profile associated with an emulation device, the emulation device color profile being different from the first device color profile;
    determine a first minimum luminance that the output device can produce based on the first device color profile;
    determine a second minimum luminance that the emulation device can produce based on the emulation device color profile; and
    select a rendering intent based on a difference between the first minimum luminance and the second minimum luminance.

11. The program product of claim 10, further comprising instructions to:
    select a perceptual rendering intent when the difference between the first minimum luminance and the second minimum luminance exceeds a predefined value; and
    select a calorimetric rendering intent otherwise.

12. The program product of claim 10, further comprising instructions to:
    select a composite rendering intent when the difference between the first minimum luminance and the second minimum luminance exceeds a predefined value.

13. The program product of claim 10, further comprising instructions to:
    select a composite rendering intent when the difference between the first minimum luminance and the second minimum luminance does not exceed a predefined value.

14. The program product of claim 10, further comprising instructions to:
    derive the first minimum luminance based on the device color profile with respect to maximum colorant values.

15. The program product of claim 14, wherein the output device is an inkjet printer, and determining the maximum colorant values includes:
    determining darkest colorant values that the inkjet printer can print.

16. The program product of claim 14, wherein the emulation device is an inkjet printer, and determining the maximum colorant values includes:
    determining darkest colorant values the inkjet printer can print.

17. The program product of claim 10, wherein the emulation device is a device configured to generate output simulating the output device.

18. The program product of claim 17, wherein the output device is a printing press and the emulation device is a proofing printer, the program product further comprising instructions to:
    receive a selection indicative of the printing press color profile; and
    receive a selection indicative of the proofing printer color profile.

19. A system, comprising:
    means for identifying a first device color profile associated with an output device;
    means for identifying an emulation device color profile associated with an emulation device, the emulation device color profile being different from the first device color profile;

means for determining a first minimum luminance that the output device can produce based on the first device color profile;

means for determining a second minimum luminance that the emulation device can produce based on the emulation device color profile; and means for selecting a rendering intent based on a difference between the first minimum luminance and the second minimum luminance.

20. The system of claim 19, further comprising:

means for selecting a perceptual rendering intent when the difference between the first minimum luminance and the second minimum luminance exceeds a predefined value; and means for selecting a calorimetric rendering intent otherwise.

21. The system of claim 19, further comprising:

means for selecting a composite rendering intent when the difference between the first minimum luminance and the second minimum luminance exceeds a predefined value.

22. The system of claim 19, further comprising:

means for selecting a composite rendering intent when the difference between the first minimum luminance and the second minimum luminance does not exceed a predefined value.

23. The system of claim 19, further comprising:

means for deriving the first minimum luminance based on the device color profile with respect to maximum colorant values.

24. The system of claim 23, wherein the output device is an inkjet printer, and determining the maximum colorant values includes:

determining darkest colorant values that the inkjet printer can print.

25. The system of claim 23, wherein the emulation device is an inkjet printer, and determining the maximum colorant values includes:

determining darkest colorant values the inkjet printer can print.

26. The system of claim 19, wherein the emulation device is a device configured to generate output simulating the output device.

27. The system of claim 26, wherein the output device is a printing press and the emulation device is a proofing printer, the system further comprising:

means for receiving a selection indicative of the printing press color profile; and means for receiving a selection indicative of the proofing printer color profile.

* * * * *

UNITED STATES PATENT AND TRADEMARK OFFICE
CERTIFICATE OF CORRECTION

PATENT NO. : 7,423,780 B1  
APPLICATION NO. : 11/696174  
DATED : September 9, 2008  
INVENTOR(S) : Peter S. MacLeod Page 1 of 1

It is certified that error appears in the above-identified patent and that said Letters Patent is hereby corrected as shown below:

Claim 2:
    column 13, line 34:
        delete "calorimetric", and replace with --colorimetric--

Claim 11:
    column 14, line 23:
        delete "calorimetric", and replace with --colorimetric--

Claim 20:
    column 15, line 15:
        delete "calorimetric", and replace with --colorimetric--

Signed and Sealed this

Third Day of February, 2009

JOHN DOLL  
*Acting Director of the United States Patent and Trademark Office*